United States Patent Office 3,007,900
Patented Nov. 7, 1961

3,007,900
POLYBIBENZOATE/ALICYCLIC
DICARBOXYLATES
Marion R. Lytton, West Chester, Edward A. Wielicki, Philadelphia, and Robert D. Evans, West Chester, Pa., assignors to American Viscose Corporation, Philadelphia, Pa., a corporation of Delaware
No Drawing. Filed July 28, 1958, Ser. No. 751,168
9 Claims. (Cl. 260—75)

This invention relates to new and useful interpolyesters, shaped articles prepared therefrom and methods of preparing the same. More particularly it is directed to unique interpolyesters of bibenzoic acid, a glycol and an alicyclic dicarboxylic acid. This invention relates to films, fibers, molded products, coatings and other shaped articles prepared from the unique interpolyesters described above.

The history of polyesters is a relatively short but active one. Condensation polyesters, while encountered in early researches such as those of Lourenco, Bischoff, Fischer, etc., were not intensively studied until 1928, when Carothers and co-workers began a systematic study of condensation polymerization. Illustrative of Carothers' work is U.S. Patent No. 2,071,250 (1937) which discusses some of the previous work in the field and some of the problems in drawing polyesters into fibers. Carothers produced filaments from his polyesters, but they were low-melting and lacked hydrolytic stability.

The current prior art describes various linear condensation polyesters derived from dihydroxy compounds and dibasic acids, such as terephthalic acid, which are capable of being drawn into fibers showing, by characteristic X-ray patterns, orientation along the fiber axis. However, in using a single glycol and single acid to prepared a polyester, one is limited to a fixed crystal structure and melting point since the constitution of the polymer cannot be varied.

In recent years a limited amount of work has been done involving bibenzoic acid and its esters in connection with homopolyesters. The prior art indicates, however, that this work was not generally fruitful, for a homopolyester of bibenzoic acid and a glycol (e.g. polyethylenebibenzoate) possesses an extremely high melting point making its use in shaped articles entirely impractical, particularly when attempts were made to use it as a film or fiber-forming material. Moreover, and possibly more important, known polybibenzoates exhibit an extremely high rate of crystallization, making orientation of fibers or films therefrom extremely difficult and costly, if not impossible, from a commercial standpoint.

This invention overcomes these limitations in providing as one of its objects new and useful highly polymeric interpolyesters of bibenzoic acid and an alicyclic acid having valuable properties, including those of being capable of being formed into useful filaments, films, and the like. It is a further object of this invention to provide unique interpolyesters as describer above which possess melting points and rates of crystallization which make them amenable to the preparation of new and useful fibers, films, molded products, coatings, other shaped articles and the like. A still further object is the provision of unique interpolyesters having a low degree of solubility in organic solvents. A further object is the provision of new and useful synthetic filaments and films possessing improved moisture regain characteristics. Another object is the provision of new and useful synthetic fibers, film and molded objects having improved dyeing characteristics. A still further object is the provision of a new process for making the unique interpolyesters of this invention. Other objects will appear hereinafter.

The synthetic products according to the present invention are difficultly soluble, usually crystallizable, orientable, highly polymerized interpolyesters of (1) bibenzoic acid having the general formula:

(2) an alicyclic acid having the general formula:

$HOOC—(CH_2)_g—(A)_k—$
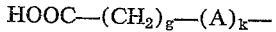 $(CH_2)_h—A—(CH_2)_j—COOH$ wherein A is an alicyclic hydrocarbon radical containing from 4 to 12 carbon atoms, $g$, $h$, and $j$ are same or different integers from 0 to 8, and $k$ is an integer from 0 to 1, and (3) a glycol or dihydric alcohol selected from the group consisting of one having the general formula:

(A)                  HO—R—OH wherein R is a bivalent straight or branched chain aliphatic hydrocarbon radical containing 2 to 20 carbon atoms, or (B)                HO—(R'X)$_n$—R'OH wherein R' is a bivalent straight or branched chain aliphatic hydrocarbon radical containing 2 to 10 carbon atoms, X is an ether oxygen or sulfone and $n$ is an integer from 1 to 6 , or (C)         HO—(CH$_2$)$_m$—Ar—(CH$_2$)$_m$—OH wherein Ar is a mono- or di-nuclear aromatic hydrocarbon radical containing 6 to 12 nuclear carbon atoms and $m$ is an integer from 1 to 4, or (D)
   HO—(R'X)$_n$—(CH$_2$)$_p$—Ar—(CH$_2$)$_p$—(XR')$_n$—OH wherein R', X and $n$ are the same as in (B), Ar is the same as in (C), and $p$ is an integer from 0 to 4, or (E)              HO(CH$_2$)$_p$—R''—(CH$_2$)$_p$—OH wherein R'' is an alicyclic hydrocarbon radical containing 4 to 6 carbon atoms and $p$ is the same as in (D), or (F)
   HO—(R'X)$_n$—(CH$_2$)$_p$—R''—(CH$_2$)$_p$—(XR')$_n$—OH wherein R', X and $n$ are the same as in (B), $p$ is the same as in (D), and R'' is the same as in (E).

The polyesters of the present invention possess, among others, the following superior fiber and film properties: (1) controlled melting points over a relatively wide range, i.e. above 140° C., (2) toughness, (3) controlled crystallizability dependent upon thermal and orienting treatment, (4) orientability, (5) pliability and (6) lack of color. Items (1) and (3) are important in order that the fiber or film have good thermal and dimensional stability, as well as orientability, under a variety of conditions. The advantages of toughness, pliability and lack of color are readily apparent. In order that these latter characteristics be attained, the fiber or film forming polymer must not crystallize too rapidly; otherwise it will not be possible to properly orient it. In other words, it must be capable of being easily converted to an amorphous form which can be oriented by cold or hot drawing or other known orienting procedures. On the other hand, the fiber film-forming polymer must have latent ability to crystallize, for if it does not it is then brittle toward impact and possesses poor dimensional stability.

In preparing the unique interpolyesters of this invention bibenzoic acid, or a diester or acid chloride thereof, is reacted with the alicyclic dicarboxylic acid described above, or a diester or acid chloride thereof, and one of glycols described above. Since the time required to form the interpolyesters of this invention is generally considerably less, and/or side reactions can generally be minimized to a greater degree than when the free dicarboxylic acids are employed, an ester interchange reaction is generally preferred.

The ester interchange method for preparing the interpolyesters of this invention proceeds in three stages:

(I) One mole of a mixture of a diester of bibenzoic acid and a diester of one of the alicyclic acids described above is reacted in the presence of heat and an ester interchange catalyst with at least two moles of a glycol and a monohydric alcohol is distilled off;

(II) The temperature is gradually raised to bring about polymerization and excess glycol is distilled off; and (III) Polymerization is driven to completion by gradually reducing the pressure to remove the last traces of glycol.

The overall process is illustrated by the following equations:

(I)

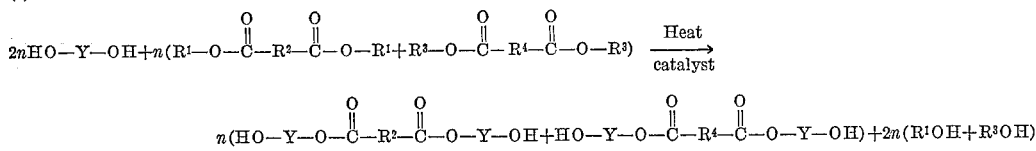

(II and III)

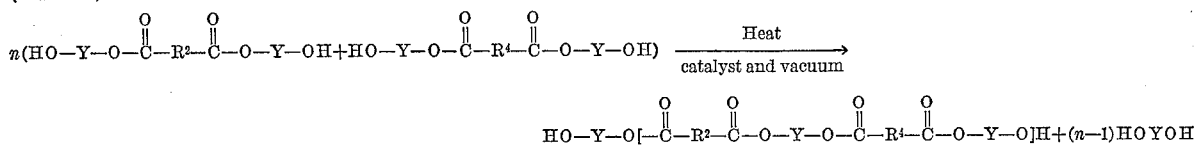

wherein Y is a bivalent hydrocarbon or hetero hydrocarbon radical as described in (A) through (F) above; $R^1$ and $R^3$ are same or different hydrocarbon radicals derived from a straight or branched chain aliphatic primary or secondary monohydric alcohol boiling within the range from about 64° to 215° C.; $R^2$ is hydrocarbon residue of bibenzoic acid and $R^4$ is the hydrocarbon residue of one of the alicyclic acids described above.

In a preferred embodiment of this invention, the mixture of monomeric diesters described above (in a ratio of 30 to 90 mole percent of a bibenzoate and 70 to 10 mole percent of an alicyclic dicarboxylate) and a glycol are weighed into a vessel, the ester interchange catalyst added, and a boiling chip introduced. Stage (I) ester interchange is then carried out at atmospheric pressure under nitrogen at a temperature between about 150° and 225° C. (preferably 175° to 200° C.) for about 2 to 10 hours, distilling off monohydric alcohol. Polymerization is then brought about in stage (II) by raising the temperature gradually to between about 200° and 400° C. (preferably about 260° to 290° C.) over a period of about ½ to 2 hours, continuing polymerization for a period of about ½ to 3 hours at this temperature and distilling off excess glycol. In stage (III) pressure is gradually reduced to below about 5 mm. (preferably 0.2 to 0.5) over a period of about ½ to 4 hours (preferably about 1 to 2 hours), followed by continued heating at this elevated temperature and reduced pressure for a period of about 2 to 10 hours. In this latter step the last traces of the glycol are distilled off and the reaction mixture becomes progressively more viscous.

The specific temperatures and heating periods may vary over wider ranges than those outlined above depending on the observed rate of reaction. In cases where reaction becomes sluggish, higher temperature and/or longer periods of time will be employed. In those cases when the polymer is solidified, or begins to solidify before it is apparent all glycol has been removed, the terperature and/or the heating period are increased. The conditions can be varied considerably depending upon the degree of the polyesterification desired, the ultimate properties sought, stability of the polyester being produced and use for which the product is intended. When the desired viscosity is reached under these conditions in stage (III), evacuation and heating are discontinued, an inert gas admitted, the vessel allowed to cool to approximately room temperature and the polyester removed.

In theory a total of only one mole of the glycol is necessary to effect complete polyesterification with one mole of the mixed monomeric diesters of bibenzoic acid and one of the alicyclic acids. However, in practice, it is difficult to attain complete reaction under these conditions. It is therefore usually necessary to utilize an excess of the glycol, preferably at least two moles of glycol to one mole of mixed diesters. Quantities, substantially larger than about 2 moles of the glycol may be used; however, since they are not necessary, in the interests of economy, they are not recommended.

Examples of some of the various monomeric diesters which can be employed in accordance with the process of the invention include those derived from bibenzoic acid, the alicyclic acids of this invention and one of the following primary monohydric alcohols: methanol, ethanol, propanol-1, 2-methyl - propanol - 1, butanol-1, 2-methyl-butanol-4, 2,2-dimethyl propanol-1, pentanol-1, 2-methyl-pentanol-1, 2 - methyl-pentanol-5, 3 - methylol - pentane, hexanol-1, 2-methyl-hexanol-1, 2-methyl-hexanol-6, heptanol-1, 2-ethyl-hexanol-1, octanol-1, nonanol-1, 2,6-dimethyl- 3-methylol heptane. Diesters derived from these same acids and secondary monohydric alcohols can be utilized also, e.g. propanol-2, butanol-2, 2-methyl-butanol-3, pentanol-2, pentanol-3, 2-methyl-pentanol-3, 3-methyl-pentanol-2, hexanol-2, 2,2-dimethyl-butanol-3, 2-methyl-hexanol-3, heptanol-4, octanol-2, decanol-4. Conveniently, the foregoing may be described as lower alkyl diesters of bibenzoic and the alicyclic acids.

Since in the preferred process, the alcohols from which the diesters are derived are removed from the reaction zone by boiling, it is generally necessary to utilize a glycol having a boiling point higher than that of the alcohol being evolved. Examples of some of the glycols described in (A) through (F) above are as follows:

(A) Ethylene, trimethylene, tetramethylene, pentamethylene, hexamethylene, decamethylene glycols, 2,2-dimethyl-1,3-propanediol, 2,2,3,3 - tetramethyl - 1, 4-butanediol, 2-buten-1,4-diol, 2-hexen-1, 6-diol, 3-octen-1,8-diol, 2-penten-1,1,4-diol, 3-hepten-1,5-diol, etc., (B) Diethylene glycol, triethylene glycol, tetraethylene glycol, dipropylene glycol, 4,4'-dihydroxy dibutyl ether, other polyoxyalkylene glycols having 1 to 6 oxyalkylene units wherein said oxyalkylene unit contains 1 to 10 carbon atoms, 2,2' - sulfonyl - diethanol, 4,4'-sulfonyl-dibutanol, 3,3'-[sulfonyl - bis - (3-propyl-sulfonyl)-] dipropanol, 4,4' - [1,4 - butylene-disulfonyl - bis - (4-butyl-sulfonyl)-] dibutanol, sulfonyl-bis-(4-butyl-sulfonyl-4-butyl-sulfonyl-4-butanol), 6,6' - (1,6 - hexylene - disulfonyl)-dihexanol, sulfonyl-bis-[3-(2,2 - dimethyl) - propanol], 1,3-

(2,2-dimethyl) - propylene - disulfonyl - bis - [3 - (2,2-dimethyl)-propyl-sulfonyl-3-(2,2-dimethyl) - propanol], sulfonyl-bis-[4-(2,2,3,3-tetramethyl)-butanol], etc., (C) p-Xylene glycol; 3,6-bis-(hydroxymethyl)-durene, 4,4'-bis-(hydroxymethyl)-diphenyl, 2,6-bis-(hydroxymethyl)-naphthalene, 1,5-bis-(β-hydroxyethyl) - naphthalene, 1,4 - bis - (β - hydroxyethyl) benzene, 1,4 - bis - (γ-hydroxypropyl)-benzene, 3,6 - bis - (β-hydroxyethyl) durene, etc., (D) 2,2' - (p - phenylene-dioxy) - diethanol, 3,3'(p-xylylene-dioxy)-dipropanol, 4,4'-(p-phenylene-disulfonyl) dibutanol, 6,6'-(p-xylylene - disulfonyl) - dihexanol, 2,2'-(p,p'-biphenylene - dioxy) - diethanol, (1,5 - naphthalene-disulfonyl)-dimethanol, etc., (E) 1,4-cyclohexane-β,β'-diethanol, 1,4 - cyclohexane-δ,δ'-dibutanol, the dihydric alcohol derived from α pinene having the formula:

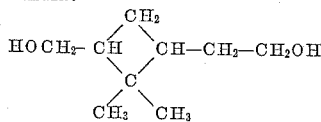

etc.;

(F) 1,4-cyclohexane-dioxy - β,β' - diethanol, 1,4-cyclohexane-disulfonyl-β,β'-diethanol, 1,4 - cyclohexane - β,β'-diethoxy-β,β'-diethanol, 1,4-cyclohexane-bis-(δ-propoxy-δ-propoxy-δ-propanol),

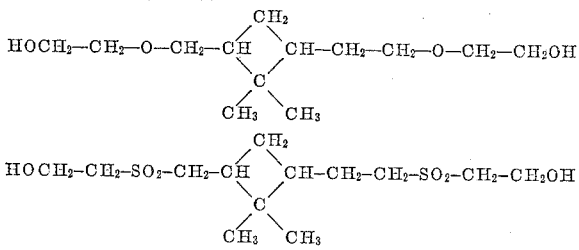

etc.

Illustrative of some of the alicyclic acids useful for this invention are the following: cyclohexylene-1,4-dicarboxylic acid (hexahydroterephthalic acid), cyclobutane-1,3-dicarboxylic acid, cyclopentane-1,3-dicarboxylic acid, 4,4'-dodecahydrobibenzoic acid, 1,2-ethylene - bis - (1,4-cyclohexane-carboxylic acid), 1,3-propylene - bis - (1,4-cyclohexane-carboxylic acid), decahydronaphthalene - 1,5 - dicarboxylic acid, decahydronaphthalene - 2,6 - dicarboxylic bicyclo[2.2.1]heptane-2,3-dicarboxylic acid, etc.

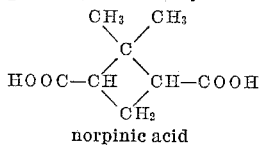
norpinic acid bicyclo[2.2.1]heptane-2,3-dicarboxylic acid, etc.

The properties of films, fibers, or other molded objects which constitute a preferred embodiment of this invention vary greatly depending in a large measure upon the identity of the glycol utilized to form the interpolyester. Thus melting points, degree of crystallinity, rate of crystallizing, etc. will vary considerably. Interpolyesters formed from different glycols within any one of the groups (A) through (F) above will generally be substantially similar to one another in their properties. On the other hand, those formed from different glycols chosen from different groups may vary greatly in their properties. In a like manner, the quantity, and, to a lesser degree, the identity of the acid described above in (2) can cause substantial variation in the properties of the interpolyesters of this invention. Accordingly, although the use of bibenzoic acid in a quantity in the range of 30 to 90 mol percent is generally satisfactory, a range of 50 to 80 mol percent is generally preferred where formation of films or fibers is contemplated.

The catalytic condensing agents or ester-interchange catalyst which may be employed are conventional ones and include, for example, the alkali metals, the alkaline earth metals; the oxides, carbonates, and borates of these two groups of metals, the one to six carbon alkoxides of these two groups of metals; magnesium, zinc, and manganese; the oxides of these metals; zinc borate; the sulfates, phosphates and acetates of zinc, cadmium, magnesium, aluminum and copper; litharge or a combination of litharge with antimony trioxide and triphenyl phosphite as described in U.S. Patent No. 2,650,213; compounds of the formula:

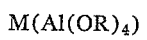

wherein M is an alkali metal, e.g. lithium, sodium, or potassium, and R is an alkyl radical containing from 1 to 6 carbon atoms; R can be derived from a lower aliphatic alcohol such as methyl, ethyl, propyl, n-butyl, isobutyl, n-amyl, etc., as described in U.S. 2,720,506; a composition consisting of lithium hydride and a glycol-soluble organic salt of cadmium, magnesium, or zinc as described in U.S. Patent No. 2,681,360.

From about 0.005% to about 0.2% of such catalysts based on the weight of diester monomer being condensed may be employed. Higher or lower percentages may also be employed. Generally, from about 0.01% to about 0.05% of the catalytic condensing agent can be advantageously employed, based on the weight of dibasic acid diester being condensed. As will be apparent to those skilled in the art, it is generally advantageous from a cost standpoint to utilize the minimum quantity of one of the above catalysts which effect optimum results. Obviously, however, quantities larger or smaller than those outlined above will be employed by those skilled in the art where needed, e.g. to accelerate or decelerate rate of reaction, to modify properties—luster, molecular weight, tenacity, etc.

The reaction can be carried out in the presence or absence of a solvent, preferably the latter. Illustrative of such solvents are inert high boiling compounds, such as diphenyl ether, diphenyl, mixed tolyl sulfones, chlorinated naphthalene, chlorinated diphenyl, dimethyl sulfolane, etc.

It is essential to exclude oxygen and moisture at all stages of the condensation reaction. Otherwise discoloration, low molecular weight, and/or insolubilization of the polyester results. Inert atmospheres which can advantageously be employed include nitrogen, hydrogen, helium, etc. The exclusion of moisture is readily effected by employing substantially anhydrous reactants.

The interpolyesters of this invention can be formed into filaments or films by conventional melt extrusion procedures. For example, the interpolyesters can be melt extruded vertically at a melt temperature of approximately 25° C. above the melting point of the interpolyester followed by immediate quenching and orientating.

In some instances it is not practicable to utilize the ester interchange method described above to prepare the interpolyesters of this invention. Accordingly, another preferred embodiment in the present invention involves the reaction of a mixture of diacid chlorides and a glycol. According to this embodiment, interpolyesters are prepared by mixing substantially molecular equivalent quantities of the glycol and the two dibasic acid chlorides. In some cases it is preferred to add the glycol to the mixture of dibasic acid chlorides in successive portions at a rate such that there is no appreciable accumulation of unreacted glycol. However, it is generally sufficient to merely mix the three reactants in a single step. If one or the other of the reactants is a solid at room temperature, it may be necessary to warm the mixture or to use a solvent in order to bring about complete solution of the reactants. The working examples herein, it will be noted, utilize both of these expedients, since the use of a solvent and an elevated temperature is the preferred mode of operation. In this initial step, if an elevated temperature is utilized, it is generally only necessary to heat to a reflux temperature.

During this initial step, rapid and copious evolution of hydrogen chloride takes place and is usually accompanied by a spontaneous rise in temperature. After the bulk of the hydrogen chloride has evolved, the mixture is then warmed gradually to a temperature in excess of about 200° C. accompanied generally by removal of the solvent by distillation. At times, it is preferably to utilize reduced pressure, i.e. below about 5 mm. of mercury, in conjunction with the second heating step in order to effect adequate polymerization to produce satisfactory molecular weights.

It is necessary in the diacid chloride method of preparing the interpolyesters of this invention to guard against there being any substantial excess of glycol in the final product. In a preferred embodiment, it is generally desirable for the polymer to possess a molecular weight of 10,000 or greater. Accordingly, it is generally necessary to prevent the inclusion of more than about a one percent excess of glycol in the finished product. On the other hand, it is sometimes possible to produce some of the interpolyesters of this invention wherein the final product may contain as much as 2½% excess over the molecular equivalent amount. This does not mean necessarily that the glycol in the reactants as charged should not exceed either of these limitations (i.e. either 1% or 2½% excess), for it has been observed that at times, small amounts of the glycol may be lost by volatilization, entrapment, etc. Thus, simply by observation, the optimum quantity to be charged can be determined from the optimum quantities found in the finished product.

Although illustrated in the preferred embodiment as a batch process, the interpolyesters of this invention can be produced by continuous methods also; for example, the required amounts of the several reactants and catalyst can be continuously metered into the reaction vessel, maintained therein for the required reaction time under the required reaction conditions of temperature and pressure and then continuously drawn off.

The following examples are not given by way of limitation, the scope of the invention being determined by the appended claims.

EXAMPLE 1

*Polyethylene bibenzoate/homopinate (60/40)*

To 143.2 parts of diethyl bibenzoate and 82 parts of diethyl homopinate was added 109.2 parts of ethylene glycol. The reactants were heated together with stirring at 160–180° C. under nitrogen at atmospheric pressure in the presence of 0.05 part lithium hydride, 0.1 part zinc acetate, and 0.1 part of manganous acetate. Ethanol distilled off and the reaction was essentially complete in three hours. The temperature was then raised to 260° C. over a period of one hour, and the pressure was gradually reduced to 0.4 mm. over the next two hours. Heating was then continued under these conditions for three hours. The product was a white opaque solid having an intrinsic viscosity of 0.5–0.6 in 40% phenol-60% tetrachlorethane solution. It had a crystalline melting point of 239° C. It could be formed into transparent, flexible films by proper treatment, and was also suitable for the preparation of fibers and molded objects.

EXAMPLE 2

*Polyethylene bibenzoate/homopinate (30/70)*

A mixture of 71.5 parts diethyl bibenzoate, 143.5 parts diethyl homopinate, and 109.2 parts ethylene glycol was polymerized using the same catalyst and heating schedule as in Example 1. The product was a rubbery solid which had an intrinsic viscosity of 0.5 to 0.6 in 40% phenol-60% tetrachlorethane solution. It could readily be formed into transparent, rubbery fibers and films.

EXAMPLE 3

*Polyethylene bibenzoate/homopinate (50/50)*

A mixture of 119.3 parts diethyl bibenzoate, 96.9 parts diethyl pinate, and 109.2 parts ethylene glycol was heated with stirring at 190° C. in the presence of 0.1 part zinc acetate and 0.1 part manganous acetate. Evolution of ethanol was complete in about four hours. The temperature was then raised to 275° C. over a period of one hour, and the pressure was gradually reduced to 0.2 mm. over a one-hour period. Heating was then continued for five hours. The crystalline melting point of the product was 213° C. It could be extruded by ordinary equipment to give fibers, tubes, rods, sheets, films, etc.

EXAMPLE 4

*Diethyl bibenzoate+diethyl pinate with ethylene glycol*

The procedure of Example 1 was repeated utilizing the mole percent of the two monomeric esters as listed below.

*Table I*

[Catalysts=50-50 wt. percent zinc acetate-manganous acetate]

| Run No. | 1 | 2 | 3 | 4 | 5 | 6 | 7 | 8 | 9 | 10 | 11 |
|---|---|---|---|---|---|---|---|---|---|---|---|
| Mole Percent Diethyl Bibenzoate | 90 | 80 | 75 | 70 | 65 | 60 | 50 | 40 | 30 | 20 | 10 |
| Mole Percent Diethyl Pinate | 10 | 20 | 25 | 30 | 35 | 40 | 50 | 60 | 70 | 80 | 90 |
| Crystalline M.P. | 341 | 337 | 324 | 313 | 273 | 238 | 213 | 171 | Gum | Gum | Gum |

EXAMPLE 5

*Diethyl bibenzoate+diethyl homopinate with ethylene glycol*

The procedure of Example 1 was repeated utilizing the mole percent of the two monomeric esters as listed below.

*Table II*

[Catalyst=20-40-40 wt. percent lithium hydride-zinc acetate-manganous acetate]

| Run No. | 1 | 2 | 3 | 4 | 5 |
|---|---|---|---|---|---|
| Mole Percent Diethyl Bibenzoate | 90 | 70 | 60 | 40 | 20 |
| Mole Percent Diethyl Homopinate | 10 | 30 | 40 | 60 | 80 |
| Crystalline M.P. | 346 | 314 | 239 | 173 | Gum |

EXAMPLE 6

*Polyethylene bibenzoate/hexahydroterephthalate— 70/30 mol percent*

A polymerization vessel fitted with an exit tube, water cooled condenser and a water cooled receiver was charged with 16.71 grams (0.056 mole) diethyl bibenzoate, 4.81 grams (0.024 mole) dimethyl hexahydroterephthalate and 10.92 g. (0.176 mole) ethylene glycol. To this mixture were added 0.01 g. zinc acetate, 0.01 g. manganous acetate and 0.005 g. lithium hydride as a mixed catalyst for ester interchange and a boiling chip to prevent bumping during subsequent heating. The polymerization vessel was evacuated and flushed with oxygen-free nitrogen 4 times prior to heating, then heated rapidly to 190° C. during which time the reactants melted with rapid evolution of alcohols. The initial ester interchange to produce the mixed glycol esters was carried out at 190° C. for 4 hours to assure complete conversion to the desired products resulting in thin mobile clear liquids which on cooling solidified to white opaque solids. The vessel was gradually heated to 250° C. over a 1 hour period with distillation of ethylene glycol. The polymerization temperature was maintained at 250° C. while the pressure was gradually reduced over a 1 hour period to less than 1 mm. and polymerization continued under these conditions for an additional 4 hours. The polymer thus produced was a buff-white opaque hard solid on cooling having a birefringent melting point of 319° C.

EXAMPLE 7

*Polyethylene bibenzoate/hexahydroterephthalate—60/40 mol percent*

A polymerization vessel fitted with an exit tube, water cooled condenser and a water cooled receiver was charged with 14.32 grams (0.048 mole) diethyl bibenzoate, 6.41 grams (0.032 mole) dimethyl hexahydroterephthalate and 10.92 g. (0.176 mole) ethylene glycol. To this mixture were added 0.01 g. zinc acetate, 0.01 g. manganous acetate and 0.005 g. lithium hydride as a mixed catalyst for ester interchange and a boiling chip to prevent bumping during subsequent heating. The polymerization vessel was evacuated and flushed with oxygen-free nitrogen 4 times prior to heating, then heated rapidly to 190° C. during which time the reactants melted with rapid evolution of alcohols. The initial ester interchange to produce the mixed glycol esters was carried out at 190° C. for 4 hours to assure complete conversion to the desired products resulting in thin mobile clear liquids which on cooling solidified to white opaque solids. The vessel was gradually heated to 250° C. over a 1 hour period with distillation of ethylene glycol. The polymerization temperature was maintained at 250° C. while the pressure was gradually reduced over a 1 hour period to less than 1 mm. and polymerization continued under these conditions for an additional 4 hours. The polymer thus produced was a buff-white opaque hard solid on cooling having a birefringent melting point of 306° C.

EXAMPLE 8

*Polyethylene bibenzoate/hexahydroterephthalate—50/50 mol percent*

A polymerization vessel fitted with an exit tube, water cooled condenser and a water cooled receiver was charged with 11.93 grams (0.04 mole) diethyl bibenzoate, 8.01 grams (0.04 mole) dimethyl hexahydroterephthalate and 10.92 g. (0.176 mole) ethylene glycol. To this mixture were added 0.01 g. zinc acetate, 0.01 g. manganous acetate and 0.005 g. lithium hydride as a mixed catalyst for ester interchange and a boiling chip to prevent bumping during subsequent heating. The polymerization vessel was evacuated and flushed with oxygen-free nitrogen 4 times prior to heating, then heated rapidly to 190° C. during which time the reactants melted with rapid evolution of alcohols. The initial ester interchange to produce the mixed glycol esters was carried out at 190° C. for 4 hours to assure complete conversion to the desired products resulting in thin mobile clear liquids which on cooling solidified to white opaque solids. The vessel was gradually heated to 250° C. over a 1 hour period with distillation of ethylene glycol. The polymerization temperature was maintained at 250° C. while the pressure was gradually reduced over a 1 hour period to less than 1 mm. and polymerization continued under these conditions for an additional 4 hours. The polymer thus produced was a viscous flesh colored liquid which crystallized to an off-white opaque hard solid on cooling. The polymer had a birefringent melting point of 227° C. and formed fibers and transparent flexible films which were quite strong and tough after orientation.

EXAMPLE 9

*Polyethylene bibenzoate/hexahydroterephthalate—40/60 mol percent*

A polymerization vessel fitted with an exit tube, water cooled condenser and a water cooled receiver was charged with 9.54 grams (0.032 mole) diethyl bibenzoate, 9.61 grams (0.048 mole) diethyl hexahydroterephthalate and 10.92 g. (0.176 mole) ethylene glycol. To this mixture were added 0.01 g. zinc acetate, 0.01 g. manganous acetate and 0.005 g. lithium hydride as a mixed catalyst for ester interchange and a boiling chip to prevent bumping during subsequent heating. The polymerization vessel was evacuated and flushed with oxygen-free nitrogen 4 times prior to heating, then heated rapidly to 190° C. during which time the reactants melted with rapid evolution of alcohols. The initial ester interchange to produce the mixed glycol esters was carried out at 190° C. for 4 hours to assure complete conversion to the desired products resulting in thin mobile clear liquids which on cooling solidified to white opaque solids. The vessel was gradually heated to 250° C. over a 1 hour period with distillation of ethylene glycol. The polymerization temperature was maintained at 250° C. while the pressure was gradually reduced over a 1 hour period to less than 1 mm. and polymerization continued under these conditions for an additional 4 hours. The polymer thus produced was a moderately viscous light tan colored liquid which crystallized to a buff-white opaque hard solid on cooling. The polymer had a birefringent melting point of 189° C. and formed fibers and transparent flexible films which were quite strong and tough after orientation.

EXAMPLE 10

*Polyethylene bibenzoate/hexahydroterephthalate—30/70 mol percent*

A polymerization vessel fitted with an exit tube, water cooled condenser and a water cooled receiver was charged with 7.16 grams (0.024 mole) diethyl bibenzoate, 11.21 grams (0.056 mole) dimethyl hexahydroterephthalate and 10.92 g. (0.176 mole) ethylene glycol. To this mixture were added 0.01 g. zinc acetate, 0.01 g. manganous acetate and 0.005 g. lithium hydride as a mixed catalyst for ester interchange and a boiling chip to prevent bumping during subsequent heating. The polymerization vessel was evacuated and flushed with oxygen-free nitrogen 4 times prior to heating, then heated rapidly to 190° C. during which time the reactants melted with rapid evolution of alcohols. The initial ester interchange to produce the mixed glycol esters was carried out at 190° C. for 4 hours to assure complete conversion to the desired products resulting in thin mobile clear liquids which on cooling solidified to white opaque solids. The vessel was gradually heated to 250° C. over a 1 hour period with distillation of ethylene glycol. The polymerization temperature was maintained at 250° C. while the pressure was gradually reduced over a 1 hour period to less than 1 mm. and polymerization continued under these conditions for an additional 4 hours. The polymer thus produced was a viscous light lemon colored liquid which crystallized to a light lemon transparent solid on cooling. The polymer had a birefringent melting point of 119° C. and formed fibers and transparent flexible films.

EXAMPLE 11

*Polyethylene bibenzoate/hexahydroterephthalate—20/80 mol percent*

A polymerization vessel fitted with an exit tube, water cooled condenser and a water cooled receiver was charged with 4.77 grams (0.016 mole) diethyl bibenzoate, 12.81 grams (0.064 mole) dimethyl hexahydroterephthalate and 10.92 g. (0.176 mole) ethylene glycol. To this mixture were added 0.01 g. zinc acetate and 0.01 g. manganous acetate and 0.005 g. lithium hydride as a mixed catalyst for ester interchange and a boiling chip to prevent bumping during subsequent heating. The polymerization vessel was evacuated and flushed with oxygen-free nitrogen 4 times prior to heating, then heated rapidly to 190° C. during which time the reactants melted with rapid evolution of alcohols. The initial ester interchange to produce the mixed glycol esters was carried out at 190° C. for 4 hours to assure complete conversion to the desired products resulting in thin mobile clear liquids which on cooling solidified to white opaque solids. The vessel was gradually heated to 250° C. over a 1 hour period with distillation of ethylene glycol. The polymerization temperature was maintained at 250° C. while the pressure was gradually reduced over a 1 hour period to less than 1 mm. and polymerization continued under these conditions for an additional 5 hours. The polymer thus produced was a viscous light lemon colored liquid which crystallized to a light lemon semi-transparent solid on cooling. The polymer had a birefringent melting point of 113° C. and formed fibers and transparent flexible films.

EXAMPLE 12

*Polydiethylene bibenzoate/pinate—90/10 mol percent*

A polymerization vessel fitted with an exit tube, water cooled condenser and a water cooled receiver was charged with 16.11 grams (0.054 mole) diethyl bibenzoate, 1.45 grams (0.006 mole) diethyl pinate and 14.0 g. (0.132 mole) diethylene glycol. To this mixture were added 0.01 g. zinc acetate, 0.01 g. manganous acetate and 0.005 g. lithium hydride as a mixed catalyst for ester interchange and a boiling chip to prevent bumping during subsequent heating. The polymerization vessel was evacuated and flushed with oxygen-free nitrogen 4 times prior to heating, then heated rapidly to 180° C. during which time the reactants melted with rapid evolution of ethanol. The initial ester interchange to produce the mixed glycol esters was carried out at 180° C. for 4 hours to assure complete conversion to the desired products resulting in thin mobile clear liquids which on cooling solidified to white opaque solids. The vessel was gradually heated to 270° C. over a 1 hour period. The polymerization temperature was maintained at 270° C. while the pressure was gradually reduced over a 1 hour period to less than 1 mm. and polymerization continued under these conditions for an additional 4 hours. The polymer thus produced was a viscous buff colored liquid which crystallized to a buff opaque hard solid on cooling. The polymer had a birefringent melting point of 155° C. and formed fibers and transparent flexible films which were quite strong and tough after orientation.

EXAMPLE 13

*Polyhexamethylene bibenzoate/pinate—80/20 mol percent*

A polymerization vessel fitted with an exit tube, water cooled condenser and a water cooled receiver was charged with 14.32 grams (0.048 mole) diethyl bibenzoate, 2.91 grams (0.012 mole) diethyl pinate and 15.60 g. (0.132 mole) hexamethylene glycol. To this mixture were added 0.01 g. zinc acetate, 0.01 g. manganous acetate and 0.005 g. lithium hydride as a mixed catalyst for ester interchange and a boiling chip to prevent bumping during subsequent heating. The polymerization vessel was evacuated and flushed with oxygen-free nitrogen 4 times prior to heating, then heated rapidly to 180° C. during which time the reactants melted with rapid evolution of ethanol. The initial ester interchange to produce the mixed glycol esters was carried out at 180° C. for 4 hours to assure complete conversion to the desired products resulting in thin mobile clear liquids which on cooling solidified to white opaque solids. The vessel was gradually heated to 270° C. over a 1 hour period. The polymerization temperature was maintained at 270° C. while the pressure was gradually reduced over a 1 hour period to less than 1 mm. and polymerization continued under these conditions for an additional 5 hours. The polymer thus produced was a viscous clear liquid which crystallized to a white opaque solid on cooling. The polymer had a birefringent melting point of 195° C. and formed fibers and transparent flexible films which were quite strong and tough after orientation.

EXAMPLE 14

*Polyneopentylene bibenzoate/pinate—90/10 mol percent*

A polymerization vessel fitted with an exit tube, water cooled condenser and a water cooled receiver was charged with 16.11 grams (0.054 mole) diethyl bibenzoate, 1.45 grams (0.006 mole) diethyl pinate and 13.75 g. (0.132 mole) neopentylene glycol. To this mixture were added 0.01 g. zinc acetate, and 0.01 g. manganous acetate and 0.005 g. lithium hydride as a mixed catalyst for ester interchange and a boiling chip to prevent bumping during subsequent heating. The polymerization vessel was evacuated and flushed with oxygen-free nitrogen 4 times prior to heating, then heated rapidly to 180° C. during which time the reactants melted with rapid evolution of ethanol. The initial ester interchange to produce the mixed glycol esters was carried out at 180° C. for 4 hours to assure complete conversion to the desired products resulting in thin mobile clear liquids which on cooling solidified to white opaque solids. The vessel was gradually heated to 270° C. over a 1 hour period with distillation of neopentylene glycol. The polymerization temperature was maintained at 270° C. while the pressure was gradually reduced over a 1 hour period to less than 1 mm. and polymerization continued under these conditions for an additional 5 hours. The polymer thus produced was a tan colored liquid which solidified to a tan transparent solid on cooling, having a softening point of 126° C.

EXAMPLE 15

*Polyneopentylene bibenzoate/pinate—90/10 mol percent*

A polymerization vessel fitted with an exit tube, water cooled condenser and a water cooled receiver was charged with 14.32 grams (0.048 mole) diethyl bibenzoate, 2.91 grams (0.012 mole) diethyl pinate and 13.75 g. (0.132 mole) neopentyl glycol. To this mixture were added 0.01 g. zinc acetate, 0.01 g. manganous acetate and 0.005 g. lithium hydride as a mixed catalyst for ester interchange and a boiling chip to prevent bumping during subsequent heating. The polymerization vessel was evacuated and flushed with oxygen-free nitrogen 4 times prior to heating, then heated rapidly to 180° C. during which time the reactants melted with rapid evolution of ethanol. The initial ester interchange to produce the mixed glycol esters was carried out at 180° C. for 4 hours to assure complete conversion to the desired products resulting in thin mobile clear liquids which on cooling solidified to white opaque solids. The vessel was gradually heated to 270° C. over a 1 hour period with distillation of neopentylene glycol. The polymerization temperature was maintained at 270° C. while the pressure was gradually reduced over a 1 hour period to less than 1 mm. and polymerization continued under these conditions for an additional 5 hours. The polymer thus produced was a dark tan colored liquid which solidified to a dark tan transparent solid on cooling having a softening point of 106° C.

EXAMPLE 16

*Polyneopentylene bibenzoate/hexahydroterephthalate—80/20 mol percent*

A polymerization vessel fitted with an exit tube, water cooled condenser and a water cooled receiver was charged with 14.32 grams (0.048 mole) diethyl bibenzoate, 2.40 grams (0.012 mole) dimethyl hexahydroterephthalate and 13.75 g. (0.132 mole) neopentylene glycol. To this mixture were added 0.01 g. zinc acetate, 0.01 g. manganous acetate and 0.005 g. lithium hydride as a mixed catalyst for ester interchange and a boiling chip to prevent bumping during subsequent heating. The polymerization vessel was evacuated and flushed with oxygen-free nitrogen 4 times prior to heating, then heated rapidly to 180° C. during which time the reactants melted with rapid evolution of alcohols. The initial ester interchange to produce the mixed glycol ester was carried out at 180° C. for 4 hours to assure complete conversion to the desired products resulting in thin mobile clear liquids which on cooling solidified to white opaque solids. The vessel was gradually heated to 270° C. over a 1 hour period. The polymerization temperature was maintained at 270° C. while the pressure was gradually reduced over a 1 hour period to less than 1 mm. and polymerization continued under these conditions for an additional 4 hours. The polymer thus produced was a moderately viscous light yellow colored liquid which crystallized to a light yellow translucent brittle solid on cooling, having a softening point of 122–126° C.

EXAMPLE 17

*Polyhexamethylene bibenzoate/hexahydroterephthalate— 70/30 mol percent*

A polymerization vessel fitted with an exit tube, water cooled condenser and a water cooled receiver was charged with 12.53 grams (0.042 mole) diethyl bibenzoate, 3.60 grams (0.018 mole) dimethyl hexahydroterephthalate and 15.60 g. (0.132 mole) hexamethylene glycol. To this mixture were added 0.01 g. zinc acetate, 0.01 g. manganous acetate and 0.005 g. lithium hydride as a mixed catalyst for ester interchange and a boiling chip to prevent bumping during subsequent heating. The polymerization vessel was evacuated and flushed with oxygen-free nitrogen 4 times prior to heating, then heated rapidly to 190° C. during which time the reactants melted with rapid evolution of alcohols. The initial ester interchange to produce the mixed glycol esters was carried out at 190° C. for 4 hours to assure complete conversion to the desired products resulting in thin mobile clear liquids which on cooling solidified to white opaque solids. The vessel was gradually heated to 270° C. over a 1 hour period. The polymerization temperature was maintained at 270° C. while the pressure was gradually reduced over a 1 hour period to less than 1 mm. and polymerization continued under these conditions for an additional 4 hours. The polymer thus produced was a viscous light tan colored liquid which crystallized to a buff-white opaque hard solid on cooling. The polymer had a birefringent melting point of 178° C. and formed fibers and transparent flexible films which were quite strong.

EXAMPLE 18

*Polydecamethylene bibenzoate/hexahydroterephthalate— 80/20 mol percent*

A polymerization vessel fitted with an exit tube, water cooled condenser and a water cooled receiver was charged with 14.32 grams (0.048 mole) diethyl bibenzoate, 2.40 grams (0.012 mole) dimethyl hexahydroterephthalate and 23 g. (0.132 mole) decamethylene glycol. To this mixture were added 0.01 g. zinc acetate, 0.01 g. manganous acetate and 0.005 g. lithium hydride as a mixed catalyst for ester interchange and a boiling chip to prevent bumping during subsequent heating. The polymerization vessel was evacuated and flushed with oxygen-free nitrogen 3 times prior to heating, then heated rapidly to 180° C. during which time the reactants melted with rapid evolution of alcohols. The initial ester interchange to produce the mixed glycol esters was carried out at 180° C. for 3 hours to assure complete conversion to the desired products resulting in thin mobile clear liquids which on cooling solidified to white opaque solids. The vessel was gradually heated to 270° C. over a 1 hour period. The polymerization temperature was maintained at 270° C. while the pressure was gradually reduced over a 1 hour period to less than 1 mm. and polymerization continued under these conditions for an additional 4 hours. The polymer thus produced was a viscous clear liquid which crystallized to a white opaque hard solid on cooling. The polymer had a birefringent melting point of 147° C. and formed fibers and transparent flexible films which were quite strong and tough after orientation.

EXAMPLE 19

*Polydiethylene bibenzoate/hexahydroterephthalate— 80/20 mol percent*

A polymerization vessel fitted with an exit tube, water cooled condenser and a water cooled receiver was charged with 14.32 grams (0.048 mole) diethyl bibenzoate, 2.40 grams (0.012 mole) dimethyl hexahydroterephthalate and 14.0 g. (0.132 mole) diethylene glycol. To this mixture were added 0.01 g. zinc acetate, 0.01 g. manganous acetate and 0.005 g. lithium hydride as a mixed catalyst for ester interchange and a boiling chip to prevent bumping during subsequent heating. The polymerization vessel was evacuated and flushed with oxygen-free nitrogen 3 times prior to heating, then heated rapidly to 190° C. during which time the reactants melted with rapid evolution of alcohols. The initial ester interchange to produce the mixed glycol esters was carried out at 190° C. for 4 hours to assure complete conversion to the desired products resulting in thin mobile clear liquids which on cooling solidified to white opaque solids. The vessel was gradually heated to 270° C. over a 1 hour period. The polymerization temperature was maintained at 270° C. while the pressure was gradually reduced over a 1 hour period to less than 1 mm. and polymerization continued under these conditions for an additional 5 hours. The polymer thus produced was a very viscous light tan colored liquid which crystallized to a buff-white opaque hard solid on cooling. The polymer had a birefringent melting point of 108° C. and formed fibers and transparent flexible films which were quite strong and tough after orientation.

EXAMPLE 20

A polymerization vessel fitted with an exit tube, water cooled condenser and a water cooled receiver was charged with 10.05 grams (0.036 mole) bibenzoyl chloride, 5.36 grams (0.024 mole) pinoyl chloride and 6.97 g. (0.06 mole) cis-1,4-quinitol. To this mixture were added 20 ml. of dioxane as a solvent. The polymerization vessel was flushed with oxygen-free nitrogen and heated to reflux for 4 hours with evolution of hydrogen chloride. The solvent was removed by distillation and the polymer heated at 240° C. under less than 1 mm. pressure for three hours. The polymer thus produced was a brown colored liquid which crystallized to a light tan opaque solid on cooling. The polymer had a birefringent melting point of 225° C. and formed fibers and films.

EXAMPLE 21

A polymerization vessel fitted with an exit tube, water cooled condenser and a water cooled receiver was charged with 10.05 grams (0.036 mole) bibenzoyl chloride, 5.36 grams (0.024 mole) pinoyl chloride and 8.29 g. (0.06 mole) p-xylylene glycol. To this mixture were added 20 ml. of dry o-dichlorobenzene as a solvent. The polymerization vessel was flushed with oxygen-free nitrogen and heated to 130° C. for 4 hours with evolution of hydrogen chloride. The resulting polymer slurry was diluted with 200 ml. of dry o-dichlorobenzene and filtered to remove the precipitated polymer. The latter was washed with isopropanol and then with acetone and dried at 110° C. The dried polymer was heated under nitrogen at 270° C. and finally heated at this temperature for 3 hours under a pressure of less than 1 mm. The polymer thus produced was a tan colored liquid which crystallized to a tan opaque solid on cooling. The polymer had a birefringent melting point of 255° C. and formed fibers and transparent films.

EXAMPLE 22

A polymerization vessel fitted with an exit tube, water cooled condenser and a water cooled receiver was charged with 2.39 grams (0.008 mole) diethyl bibenzoate, 14.42 grams (0.072 mole) dimethyl hexahydroterephthalate and 10.92 g. (0.176 mole) ethylene glycol. To this mixture were added 0.01 g. zinc acetate, 0.01 g. manganous acetate and 0.005 g. lithium hydride as a mixed catalyst for ester interchange and a boiling chip to prevent bumping during subsequent heating. The polymerization vessel was evacuated and flushed with oxygen-free nitrogen 4 times prior to heating, then heated rapidly to 190° C. during which time the reactants melted with rapid evolution of alcohols. The initial ester interchange to produce the mixed glycol esters was carried out at 190° C. for 4 hours to assure complete conversion to the desired products resulting in thin mobile clear liquids which on cooling solidified to white opaque solids. The vessel was gradually heated to 250° C. over a 1 hour period with distillation of ethylene glycol. The polymerization temperature was maintained at 250° C. while the pressure was gradually reduced over a 1 hour period to less than 1 mm. and polymerization continued under these conditions for an additional 4 hours. The polymer thus produced was a viscous lemon-yellow colored liquid which crystallized to a lemon yellow opaque semi-transparent, moderately tacky solid on cooling. The polymer had a birefringent melting point of 74° C. and formed fibers and transparent flexible films.

EXAMPLE 23

A polymerization vessel fitted with an exit tube, water cooled condenser and a water cooled receiver was charged with 11.93 grams (0.04 mole) diethyl bibenzoate, 8.57 grams (0.04 mole) dimethyl ester of bicyclo[2.2.1]heptane-2,3-dicarboxylic acid and 10.92 g. (0.176 mole) ethylene glycol. To this mixture were added 0.01 g. zinc acetate and 0.01 g. manganous acetate as a mixed catalyst for ester interchange and a boiling chip to prevent bumping during subsequent heating. The polymerization vessel was evacuated and flushed with oxygen-free nitrogen 3 times prior to heating, then heated rapidly to 190° C. during which time the reactants melted with rapid evolution of alcohols. The initial ester interchange to produce the mixed glycol esters was carried out at 190° C. for 4 hours to assure complete conversion to the desired products resulting in thin moble clear liquids which on cooling solidified to white opaque solids. The vessel was gradually heated to 220° C. over a 1 hour period with distillation of ethylene glycol. The polymerization temperature was maintained at 220° C. while the pressure was gradually reduced over a 1 hour period to less than 1 mm. and polymerization continued under these conditions for an additional 4 hours. The polymer thus produced was a light colored liquid which solidified to a white translucent solid.

EXAMPLE 24

A polymerization vessel fitted with an exit tube, water cooled condenser and a water cooled receiver was charged with 14.32 grams (0.048 mole) diethyl bibenzoate, 2.40 grams (0.012 mole) dimethyl hexahydroterephthalate and 19.82 g. (0.132 mole) triethylene glycol. To this mixture were added 0.01 g. zinc acetate, 0.01 g. manganous acetate and 0.005 g. lithium hydride as a mixed catalyst for ester interchange and a boiling chip to prevent bumping during subsequent heating. The polymerization vessel was evacuated and flushed with oxygen-free nitrogen 3 times prior to heating, then heated rapidly to 190° C. during which time the reactants melted with rapid evolution of alcohols. The initial ester interchange to produce the mixed glycol esters was carried out at 190° C. for 4 hours to assure complete conversion to the desired products resulting in thin mobile clear liquids which on cooling solidified to white opaque solids. The vessel was gradually heated to 270° C. over a 1 hour period. The polymerization temperature was maintained at 270° C. while the pressure was gradually reduced over a 1 hour period to less than 1 mm. and polymerization continued under these conditions for an additional 5 hours. The polymer thus produced was a very viscous amber colored liquid which solidified to an amber transparent solid on cooling. The polymer had a softening point of 50° C. and formed fibers and transparent flexible films which were quite strong and tough after orientation. Films formed from this polymer adhered tenaciously to glass and to metals. The coated thin metal products could be repeatedly flexed with no evidence of failure of the coating film.

EXAMPLE 25

A polymerization vessel fitted with an exit tube, water cooled condenser and a water cooled receiver is charged with 10.05 grams (0.036 mole) bibenzoyl chloride, 5.36 grams (0.024 mole) pinoyl chloride and 11.88 g. (0.06 mole) 2,2'-(p-phenylenedioxy)-diethanol. To this mixture is added 20 ml. of dry o-dichlorobenzene as a solvent. The polymerization vessel is flushed with oxygen-free nitrogen and is heated to 160° C. for 7 hours with evolution of hydrogen chloride. To the polymer slurry is added 300 ml. of dry o-dichlorobenzene and the precipitated polymer is washed thoroughly with methanol and finally with acetone and the fine white polymer is dried at 110' C. Fibers and films can be formed from the crystalline powder by melt extrusion.

We claim:

1. A filament and film forming linear interpolyester melting above 140° C. of reactants consisting essentially of a mixture of from 30 to 90 mol % of p,p' bibenzoic acid and from 70 to 10 mol percent of an alicyclic acid, and at least about 2 mols of a glycol per mol of mixed acids, said glycols selected from the group consisting of a glycol having the general formula

wherein R is an alkylene radical having from 2 to 20 carbon atoms and a glycol having the general formula

wherein R' is an alkylene radical having 2 to 10 carbon atoms, and n is an integer of from 1 to 6.

2. The linear interpolyester of claim 1 melting above 200° C.

3. The linear interpolyester of claim 1 wherein the acid reactants consist of from 50 to 70 mol percent of bibenzoic acid and from 50 to 30 mol percent of the alicyclic acid.

4. The linear interpolyester of claim 1 wherein the alicyclic acid is a pinic acid and the glycol is ethylene glycol.

5. The process of preparing filament and film forming linear interpolyesters melting above 140° C. which comprises reacting components consisting essentially of a mixture of from 30 to 90 mol percent of a lower alkyl diester of p,p' bibenzoic acid and from 70 to 10 mol percent of a lower alkyl diester of an alicyclic acid, and at least about 2 mols of a glycol per mol of mixed acids; reacting said components at a temperature above 150° C. in the presence of an ester interchange catalyst and in the absence of oxygen and moisture.

6. The process of claim 5 wherein the initial reaction temperature is kept from 150 to 225° C. until no further alcohol is liberated and thereafter the temperature is raised to from 200 to 400° C. with a gradual reduction of pressure to less than 5 mm. of mercury.

7. The process of claim 5 wherein the initial temperature ranges from 175 to 200° C., the temperature is raised to from 260 to 290° C., and the pressure is reduced to from 0.2 to 0.5 mm. of mercury.

8. The process of claim 5 wherein the alicyclic acid is a pinic acid and the glycol is ethylene glycol.

9. The process of preparing filament and film forming linear interpolyesters melting above 200° C. which comprises reacting components consisting essentially of from 50 to 70 mol percent of a lower alkyl diester of p,p' acid and from 50 to 30 mol percent of a lower alkyl diester of a pinic acid, and at least 2 mols of ethylene glycol per mol of mixed acids; reacting said components in the presence of an ester interchange catalyst and in the absence of oxygen and moisture at an initial temperature of from 175 to 200° C. until no further alcohol is liberated, and thereafter increasing the temperature to from 260 to 290° C. at a gradual reduction of reaction pressure to from 0.1 to 0.2 mm. of mercury.

References Cited in the file of this patent

UNITED STATES PATENTS

| | | |
|---|---|---|
| 2,180,418 | James | Nov. 21, 1939 |
| 2,437,046 | Rothrock et al. | Mar. 2, 1948 |
| 2,623,033 | Snyder | Dec. 23, 1952 |
| 2,721,854 | Kohl | Oct. 25, 1955 |
| 2,750,411 | Fisher et al. | June 12, 1956 |

OTHER REFERENCES

Murphy et al.: "Pinic Acid Diesters," Ind. & Eng. Chem., vol. 45, No. 1, January 1953, pp. 119–124.

UNITED STATES PATENT OFFICE
CERTIFICATE OF CORRECTION

Patent No. 3,007,900                                November 7, 1961

Marion R. Lytton et al.

It is hereby certified that error appears in the above numbered patent requiring correction and that the said Letters Patent should read as corrected below.

Column 1, line 35, for "prepared" read -- prepare --; line 59, for "describer" read -- described --; column 2, lines 5 to 7, after the formula, insert a comma; column 3, line 73, for "terperature" read -- temperature --; column 4, line 65, for "-1,1,4-diol" read -- 1,4-diol --; column 5, line 10, for "3,3'(p-" read -- 3,3'-(p- --; lines 26 and 27, for "-(δ-propoxy-δ-propoxy-δ-propanol)" read -- -(γ-propoxy-γ-propoxy-γ-propanol) --; line 47, for "bicyclo[2.2.1] heptane -2,3-dicarboxylic acid, etc." read -- acid, pinic acid, homopinic acid, --; same column 5, line 53, for "norpinic acid" read -- norpinic acid --; column 7, line 6, for "preferably" read -- preferable --; column 10, line 8, for "diethyl" read -- dimethyl --; column 12, line 36, for "90/10", in italics, read -- 80/20 --, in italics; column 16, line 28, for "110' C." read -- 110° C. --; column 17, line 4, before "acid" insert -- bibenzoic --.

Signed and sealed this 24th day of April 1962.

(SEAL)

Attest:

ESTON G. JOHNSON
Attesting Officer

DAVID L. LADD
Commissioner of Patents